July 24, 1956     V. C. SMITH ET AL     2,755,663
ENGINE TEST AIR SUPPLY SYSTEM
Filed March 16, 1953
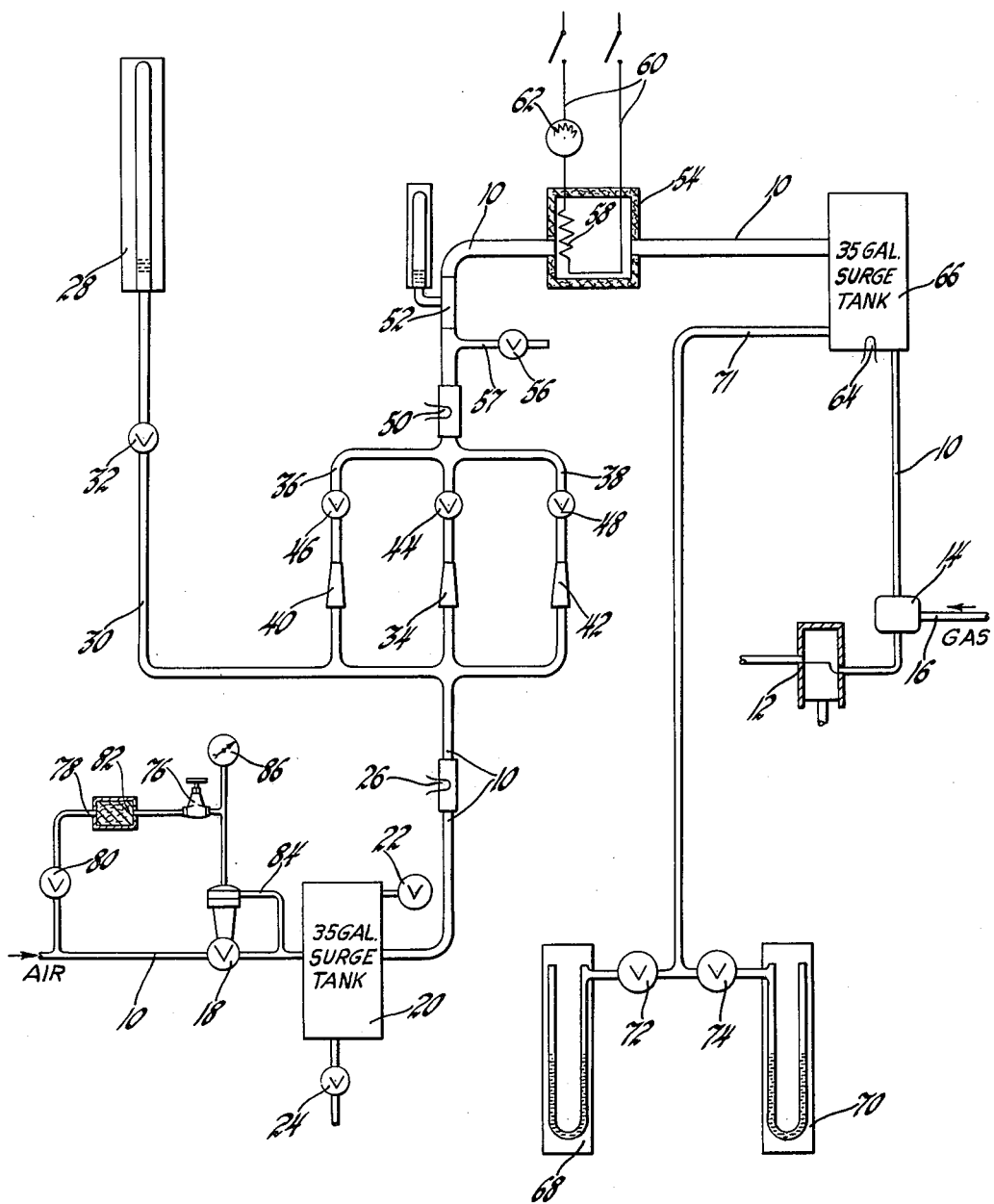
Inventors
Victor C. Smith,
Albert S. Lecky &
Basil D'Alleva
By Lewis D. Burch
Attorney

United States Patent Office 2,755,663
Patented July 24, 1956

2,755,663

ENGINE TEST AIR SUPPLY SYSTEM

Victor C. Smith and Albert S. Lecky, Detroit, and Basil A. D'Alleva, Royal Oak, Mich., assignors to General Motors Corporation, Detroit, Mich., a corporation of Delaware Application March 16, 1953, Serial No. 342,452

1 Claim. (Cl. 73—116)

This invention relates to an air supply system and has particular reference to engine intake air supply systems for use with internal combustion engines where accurate control and measurement of air flow is desirous under variable engine operating conditions.

In the development and design of internal combustion engines time and expense could be greatly minimized and fundamental engine performance information more readily obtained with regard to full-scale engine operation if single-cylinder test engine results could be applied directly to full-scale engines. However, the inability to duplicate road operating conditions in a laboratory test model has heretofore made such correlation unreliable and inaccurate in most instances.

In order to adequately duplicate the operating conditions of a full-scale engine in a single-cylinder test engine it is necessary to be able to accurately control the fuel-air charge. This requires control of the pressure and temperature of the charge entering the engine to eliminate adverse effects caused by changes in atmospheric conditions. Once the desired conditions are obtained they must be capable of being maintained over an extended period of time to enable calculation and computation of various engine characteristics under the established conditions. A further requisite is that the mass of the fuel-air charge inducted be capable of accurate measurement and that it be independent of the fluctuation of the line pressure caused by piston action at low engine speeds.

Control of these factors is particularly important in the determinations of anti-knock qualities of fuels in the laboratory where fuel ratings must be referred to fixed operating conditions and where the investigation may extend over a prolonged period of time. Power output of an internal combustion engine depends upon the mass of the fuel-air charge inducted which is determined by the pressure and temperature of the charge at the time of induction. In normally aspirated engines, maximum full throttle power output varies with the inlet pressure and temperature, and both of these quantities vary with atmospheric conditions; hence to maintain engine power constant at all times, pressure and temperature of the incoming charge must be fixed and an accurate method of measuring the mass of the inducted charge is necessary in order that the test conditions may be held and closely repeated.

It is now proposed to provide an air supply system which may be employed with a single-cylinder test engine that is capable of duplicating the air charge introduced to a full-scale engine under various operating conditions. It is intended to provide an air supply system having an air flow that may be accurately measured and controlled and which may be maintained for extended periods. The proposed system is intended to be independent of the effects of fluctuating pressure caused at low engine speeds and to provide a constant air charge at all times.

Accurate control and precise measurement of intake air conditions are possible by the proposed system such as will enable various degrees of supercharging and throttling in arriving at corresponding full-scale engine performance. It is intended to provide an air system where the absolute humidity remains constant and has no effect upon the air charge condition making the only variables those of air temperature and pressure which are capable of adequate control.

The proposed air system is easily installed and has controls which are simple to operate, restricted in number, and readily accessible for easy, rapid and accurate control of air intake pressure and temperature.

In the accompanying drawing is shown a schematic illustration of the proposed air supply system in association with a single-cylinder test engine and having an engine carburetor connected thereto.

The proposed air supply system comprises a conduit 10 which is adapted to communicate with a source of compressed air, such as is available in most engine test laboratories for miscellaneous laboratory uses, and to convey an air charge to an internal combustion engine 12 for use in the operation of the engine. The air charge may be introduced directly into the engine or, as in this instance, be connected to an engine carburetor 14 which is in communication with the engine. The engine carburetor has a source of engine fuel connected thereto as at 16 and is thus able to prepare a fuel-air mixture capable of combustion within the engine.

An air charge supplied to an internal combustion engine which is to be capable of measurement and precise control and adjustment should be a steady non-fluctuating flow. For this reason a valve 18 is placed in the conduit 10 at the inlet end thereof which is capable of regulating the pressure of the air emitted into the system and which regulates air entering a snubber or surge tank 20 in the system downstream of the valve. The use of these two elements reduces the pulsation of the air flowing into the air supply system and provides an inducted charge capable of more accurate measurement and control. An air bleed vent valve 22 and a condensate relief valve 24 are provided on the surge tank.

The air passing through the conduit 10 from the surge tank 20 is capable of measurement as to pressure and temperature by means of pressure and temperature sensitive devices such as a thermocouple 26 and a manometer 28, connected to the conduit. A branch line 30 off from the conduit 10 to the manometer may have a shut-off valve 32 interposed therein if so desired.

The air leaving the surge tank passes through a flow nozzle 34 which is designed to produce a critical velocity flow of air therethrough. The nozzle is a long-radius, low-ratio nozzle in the nature of those suggested in ASME Power Test Code 19.5.4, 1940 "Flow Measurement by Means of Standardized Nozzles and Orifice Plates." Since the air flow requirements are variable with the engine speed and it is desirable to be able to provide an uninterrupted flow of air to the engine at all times, branch conduits 36 and 38 associated with the main conduit 10 may be provided which have critical velocity flow nozzles 40 and 42 disposed therein of different diameters for different air flow rates. The flow nozzles 34, 40 and 42 are capable of selection in accordance with the engine speed by means of shut-off valves 44, 46 and 48 connected in their respective conduits 10, 36 and 38.

The design of suitable critical flow nozzles for use with the air supply system is based upon the following dimensional form of the general flow equation for air:

$$W = 0.4165 \ C \ (D_2)^2 \ P_1/(T_1)^{1/2}$$

where $W$ = pounds of air per second
$C$ = discharge coefficient for correcting for deviations from ideal theoretical flow
$D_2$ = nozzle throat diameter in inches
$P_1$ = upstream pressure p. s. i. a.
$T_1$ = upstream temperature in degrees Rankin The most acceptable nozzle for use in the proposed air supply system is a modified long-radius, low-ratio nozzle which has a flow which causes the discharge coefficient (C) to be nearly equal to unity although other nozzles may be adapted for use. A rounded orifice or nozzle is also employed since the critical flow phenomena is more apparent in this type of nozzle than in other flow nozzles. The diameters of the nozzles employed for a selected range of engine speed will be dependent upon the flow rate desired and the maximum and minimum upstream air pressure which will be available to insure a critical air flow.

With a nozzle which produces a flow of a gas at the velocity of sound in the gas (known as the critical flow velocity) the maximum speed at which a pressure effect can be propagated through the gas is attained. As the pressure on the downstream side of the nozzle is reduced the velocity in the throat of the nozzle increases but will have no effect upon the throat pressure which is already at its maximum attainable value. Thus if the nozzle produces a critical flow against the maximum resistance to air flow any reduction in that resistance will not alter the pressure through the nozzle; hence, as applied to the proposed air supply system the air pressure attained by the critical flow nozzles is independent of fluctuating low speed engine requirements.

The air flowing through the critical flow nozzles in the conduit 10 is measurable as to temperature and pressure by means of temperature and pressure sensitive elements 50 and 52 downstream of the flow nozzles and just prior to the air passing into an air heating chamber 54. An atmospheric vent valve 56 is provided in a branch conduit 57 connected to the conduit 10 upstream of the pressure sensitive element 52. When this normally closed vent valve 56 is opened and the rest of the air supply system is cut-off, as by valve 18, atmospheric air is allowed to enter the conduit 10 and to be conducted to the engine.

The air heating chamber 54 through which the air in the conduit 10 must pass is an insulated chamber having immersion type heaters 58 projected into the chamber and connected to an electrical power source by electrical wires 60. The heat passed off by the heaters 58 is varied by the control rheostat 62 across one of the electrical leads 60 and is measured by a temperature sensitive element 64 extended into the air stream flowing through a second surge tank 66 downstream from the heating chamber 54.

The second surge tank 66 is connected to the conduit 10 and also has means of measuring the air charge pressure such as the water and mercury manometers 68 and 70 connected to the tank by conduit 71 and which are selectable by means of cut-off valves 72 and 74 respectively. The second surge tank 66 tends to dampen out pressure surges that may develop in the system at the outlet end of the conduit 10 just as the other surge tank 20 is intended to accomplish the same result at the inlet end of the conduit. Since the conduit passes directly to the engine 12 from the second surge tank, backfire screens may be mounted therebetween and the tank 66 may be provided with a blow-out head as a safety precaution.

The air charge may be introduced directly to the engine 12 or may communicate with an engine carburetor 14 as shown wherein the air-fuel ratio for a proper combustible mixture is attained as previously explained.

Since the intake air pressure from the air supply source must be subject to accurate and sensitive control over the entire range of flow and is more readily controlled through a control panel it is advisable to have a diaphragm valve 18 in the supply conduit 10 which is controlled by a more sensitive pressure control regulator valve 76 positioned in a by-pass conduit 78 associated with the air supply conduit 10. Air is admitted to the by-pass conduit 78 by opening cut-off valve 80 disposed therein. In the present instance a Nullmatic pressure regulator valve 75 (Model No. 40-50, Moore Products Co., Philadelphia, Pa.) is employed although other similar means may be adaptable for use, to supply air pressure to one side of a diaphragm of the regulator valve 18. An air-water separator 82 is disposed within the by-pass conduit 78 to insure that air supplied to the pressure control regulator valve 76 in the by-pass line is dry as is required by the particular valve herein employed. A conduit 84 is connected to the main air supply conduit 10 downstream of the diaphragm pressure regulating valve 18 to supply a balancing air pressure to the underside of the diaphragm valve. The use of the proposed pressure regulating means enables critical sensitivity control of the air flowing into the surge tank 20 with a wide range of adjustment in settings for a small change in air flow and also enables maintaining a given setting irrespective of changes in conduit supply pressure. The setting of the control valve 76 is indicated by the pressure gage 86 in the by-pass conduit 78.

The humidity of the air supplied by the proposed system has no effect upon the calibration of the flow nozzles and consequently no effect upon the combustion process in the engine where air from a test laboratory compressed air line is used which is saturated. Such a condition is evidenced by the pressure of liquid water in the supply conduit 10. When the pressure of the system is reduced either by reducing valves such as 18 or by passage through one of the flow nozzles 34, 40 or 42, the air may become desaturated but no water will be condensed from the air. In other words, the relative humidity is lowered, but the absolute humidity remains constant. Although the air is not thereafter saturated, no additional water is picked up in passing through the system. The weight concentration of water vapor present in the air supplied by the system in the engine is thus equal to that of saturated air at the pressure and temperature existing at the supply source.

In practice, the engine 12 is warmed up under normally aspirated conditions, that is, with the valve 56 in the air supply system open to the atmosphere. When the desired engine operating temperatures have been reached and stabilized the metering and supply system is ready to be placed in operation. The particular flow nozzle 34, 40 or 42 which will give critical air flow at the given engine speed is first cut-in by opening the proper valve 44, 46 or 48 respectively. Air pressure is then built up in the first surge tank 20 by manipulation of the pressure control regulator valve 76 controlling the diaphragm valve 18 across the inlet end of the air supply conduit 10 until atmospheric pressure is reached when the valve 56 may be closed. By this procedure no sudden or excessive supercharging or throttling effect is obtained which would interfere with carburation. The desired engine intake-air density may now be set by adjusting the pressure control regulator valve 76 and the air heater rheostat 62 to yield the required air pressure and temperature in the second surge tank 66. When equilibrium is reached, the mass rate of air flowing to the engine may be determined by observing the pressure gage 28 and temperature sensitive element 26 upstream of the selected flow nozzle, and by minor mathematical computation or reference to an applicable calibration diagram.

We claim:

An air supply control system for use with an internal combustion engine having piston means producing variant flow resistant pressures at the inlet side thereof, said system including a flow conduit connected between an air supply source and said engine, pressure regulating means connected within said conduit at the inlet side thereof, a critical flow nozzle interposed within said conduit intermediate the ends thereof, temperature control means connected within said conduit between said engine and said flow nozzle for varying the temperature of the air flowing therethrough, and surge tanks connected within said conduit on opposite sides of said nozzle for stabilizing the upstream and downstream air flow pressures, said critical flow nozzle accelerating the flow of air therethrough to sonic velocity for resistance to variant downstream pressure fluctuations caused by said engine and flowing back through the downstream surge tank for more accurate metering control of air flow to said engine.

References Cited in the file of this patent

UNITED STATES PATENTS 2,567,519     Livingston _____ Sept. 11, 1951

FOREIGN PATENTS 621,086     Germany _____ Nov. 1, 1935

OTHER REFERENCES

"An Accurate Gas Metering System for Laminar Flow Studies," by Andersen and Friedman, published in The Review of Scientific Instruments, vol. 20, No. 1, January 1949.